United States Patent
Cano et al.

(10) Patent No.: US 7,370,963 B2
(45) Date of Patent: May 13, 2008

(54) OPHTHALMIC LENS WITH ELECTRO-OPTICAL FUNCTION

(75) Inventors: Jean-Paul Cano, Charenton-le-Pont (FR); Frédéric Chaput, Charenton-le-Pont (FR); Andreas F. Meyer, Féchy/VD (CH); Toby B. Meyer, Féchy/VD (CH)

(73) Assignee: Essilor International (Compagnie General d'Optique), Charenton le Pont (FR)

( * ) Notice: Subject to any disclaimer, the term of this patent is extended or adjusted under 35 U.S.C. 154(b) by 321 days.

(21) Appl. No.: 11/149,435

(22) Filed: Jun. 10, 2005

(65) Prior Publication Data
US 2005/0280769 A1    Dec. 22, 2005

(30) Foreign Application Priority Data
Jun. 11, 2004 (FR) .................................. 04 06371

(51) Int. Cl.
    *G02C 7/10* (2006.01)
(52) U.S. Cl. ........................ 351/163; 351/165
(58) Field of Classification Search ............ 351/160 R, 351/160 H, 162, 163, 165, 164
    See application file for complete search history.

(56) References Cited

U.S. PATENT DOCUMENTS

| 5,377,037 A | 12/1994 | Branz et al. |
| 5,552,841 A | 9/1996 | Gallorini et al. |
| 5,654,786 A * | 8/1997 | Bylander ..................... 351/49 |
| 6,433,913 B1 * | 8/2002 | Bauer et al. ................. 359/265 |
| 6,851,805 B2 * | 2/2005 | Blum et al. ............. 351/160 R |
| 2007/0052876 A1 * | 3/2007 | Kaufman et al. ............. 349/13 |

FOREIGN PATENT DOCUMENTS

| DE | 102 15 568 A1 | 10/2003 |
| WO | WO 03/069394 A1 | 8/2003 |

* cited by examiner

*Primary Examiner*—Scott J. Sugarman
(74) *Attorney, Agent, or Firm*—Stites & Harbison PLLC; Ross F. Hunt, Jr.

(57) ABSTRACT

An ophthalmic lens comprises a transparent substrate and electro-optical means integrated with the substrate to perform an optical function in response to an electrical stimulus. The ophthalmic lens further comprises at least one photovoltaic cell integrated with the substrate to power the electro-optical means in response to an incident light, and optionally also a control circuit for controlling the electrical voltage. The photovoltaic cell may be incorporated in an opaque element occupying a small fraction of the area of the lens. Alternatively, the photovoltaic cell may be transparent and may cover at least a portion of the area of the lens.

22 Claims, 1 Drawing Sheet

OPHTHALMIC LENS WITH ELECTRO-OPTICAL FUNCTION

The present invention relates to an ophthalmic lens including electro-optical means.

BACKGROUND OF THE INVENTION

Numerous attempts have been made to adapt certain optical characteristics of ophthalmic lenses, or spectacles eyeglasses, dynamically in order to improve comfort or in order to provide new functions for wearers of the lenses. By way of example, the light transmission of lenses can be reduced under conditions of high brightness, and can be increased again when ambient light returns to a normal or low level of intensity. Photochromic lenses perform this function, but the variations in light transmission provided by such lenses are determined by the intensity of ultraviolet radiation illuminating the lenses. The light transmission level adopted by photochromic lenses is therefore unsuitable under certain circumstances. In particular, photochromic lenses inside a car remain in a state of high transparency whenever the level of sunlight. A car driver is therefore not protected against being dazzled when wearing spectacles with photochromic lenses.

Electro-optical systems enable an optical characteristic to be controlled by means of an electrical stimulus. By way of example, the light transmission of an electrochromic lens varies in response to an electric current.

Electro-optical systems thus require an electrical power supply in order to deliver the electrical stimulus. Small-sized batteries have been integrated with spectacles frames so as to power electro-optical devices integrated with the lenses. Such batteries have been placed on the branches or "temples" of the spectacles, or they have been hidden in the bridge of the frame between the two lenses. Electrical connections then connect the battery(ies) to the electro-optical system.

Such battery power supplies suffer from the drawback of significant weight and size. In addition, they are reserved for lenses that have been specially produced for a frame of given shape. Unfortunately, in most cases, lenses are produced independently of frames. They are then cut, turned, and/or drilled so as to be brought to the dimensions of a frame or a jig, and then they are assembled to the frame or to the jig. Because of the wide variety of shapes of frames and jigs, it is difficult to design electrical connections that include a portion that is made on the lens prior to the lens being cut to size. In addition, such connections need to be connected to the frame after the lenses have been assembled in the frame. Making such connections is particularly expensive since it requires finishing steps to be performed.

An object of the present invention thus consists in proposing an ophthalmic lens fitted with an electro-optical system that does not present the above-mentioned drawbacks.

SUMMARY OF THE INVENTION

The invention thus provides an ophthalmic lens comprising a transparent substrate and electro-optical means integrated with the substrate to perform an optical function in response to an electrical stimulus. The lens of the invention further comprises at least one photovoltaic cell integrated with the substrate to power the electro-optical means in response to incident light, and, optionally a control circuit for controlling the electrical voltage produced by the photovoltaic cell, said control circuit being integrated with the substrate.

Thus, according to the invention, both the electro-optical system and the electrical power supply are integrated with the substrate of the lens. The electrical connections between the electro-optical system and the power supply can thus also be integrated with the lens substrate, so these connections are separate from the frame. They can be implemented within the lens before it is assembled to the frame. The assembly that is performed subsequently does not need to be modified by the presence of the electro-optical system. In particular, it can be performed at low cost.

Furthermore, integrating the electrical connections in the substrate of the lens makes it possible to use connections of small dimensions, or indeed miniature connections. Such connections can be discreet or even invisible. They are therefore compatible with the appearance requirements applicable to the field of spectacles.

Another advantage of a spectacles lens according to the invention comes from the nature of the electrical power supply used. Unlike a battery, a photovoltaic cell does not need to be renewed periodically, since the energy delivered by such a cell is generated from the incident light.

In a preferred embodiment of the invention, the photovoltaic cell is sensitive to visible light. Thus, the optical function is activated as a function of the conditions of luminosity to which the eyes of the wearer of the lenses are sensitive. The optical means are thus activated in compliance with a visually perceived optical function.

The photovoltaic cell may be integrated with the lens substrate in various ways. In a first type of embodiment, the photovoltaic cell is incorporated in an opaque component integrated with the substrate and occupying less than 10% of the area of the lens. This leads to very little or even no visual impediment, given the very small size of the opaque component, which makes it possible to maintain the transparency of the lens intact over that part of the lens surface that is used for vision purposes.

In a second type of embodiment, the photovoltaic cell is partially transparent and presents a light-collecting surface that covers at least part of the surface of the lens. Under such circumstances, the light-collecting surface can be large, thereby enabling an increased electrical stimulus to be obtained. In addition, embodiments of this type do not necessarily use an opaque component, which means that lens configurations can be obtained that are particularly attractive in appearance.

The control circuit is also advantageously integrated with the lens substrate. It can enable the electrical stimulus delivered to the electro-optical means to be adapted relative to an amplitude desired for the optical function. It also makes it possible to adapt the electrical stimulus relative to intrinsic operating characteristics of the electro-optical means. In particular, the control circuit may include a step-up circuit for raising the electrical voltage produced by the photovoltaic cell, in particular for the purpose of reaching an activation threshold for the optical function.

Optionally, the control circuit may be partially transparent. Under such circumstances, it may be located at least in part in a portion of the lens that is used for vision purposes. The term "a portion of the lens that is used for vision purposes" is used to mean a portion of the lens that is located between the eye and an object being looked at in the field of view. Then there is no appearance impediment as a result of the presence of the control circuit within the lens.

Optionally, the use of a control circuit can be avoided by connecting several photovoltaic elements in series so as to obtain an appropriate power supply voltage.

The invention also provides a vision device, in particular a pair of spectacles, including at least one ophthalmic lens as described above.

BRIEF DESCRIPTION OF THE DRAWINGS

FIG. 1b is a section through a lens in the embodiment of FIG. 1a;

FIG. 2b is a section through a lens in the embodiment of FIG. 2a.

DETAILED DESCRIPTION

In the figures, and for reasons of clarity, the dimensions of the various elements shown are not proportional to their real dimensions. Furthermore; throughout the figures, identical references correspond to elements that are identical or that have identical functions.

The optical function of the lens may be of various types. It may be a function of reinforcing contrast by adapting the tint of the lens, e.g. as described in U.S. Pat. No. 6,250,759. It may be also be a function of reinforcing contrast by filtering light with a determined direction of polarization.

In the embodiments described below by way of example, the optical function of the lens is a function of providing protection against the sun, or protection against being dazzled. This function is activated electrically. In an initial state, each lens in a pair of spectacles presents high light transmission in the visible spectrum. In response to an electrical stimulus, the lens becomes darker: its light transmission is reduced in the visible spectrum.

To do this, the electro-optical means comprise a system having a variable light transmission. Such system may be of the electrochromic type, for example. In a preferred manner, it is a system with little electricity consumption, such as a system based on liquid crystals or a system of electrophoretic type. For such systems, the electrical stimulus that leads to a variation in light transmission is an electric field, i.e. it corresponds to an electrical voltage being applied across two input terminals of the system. Electricity consumption is low, and is compatible with an electrical power supply of small dimensions.

Figure 1A:
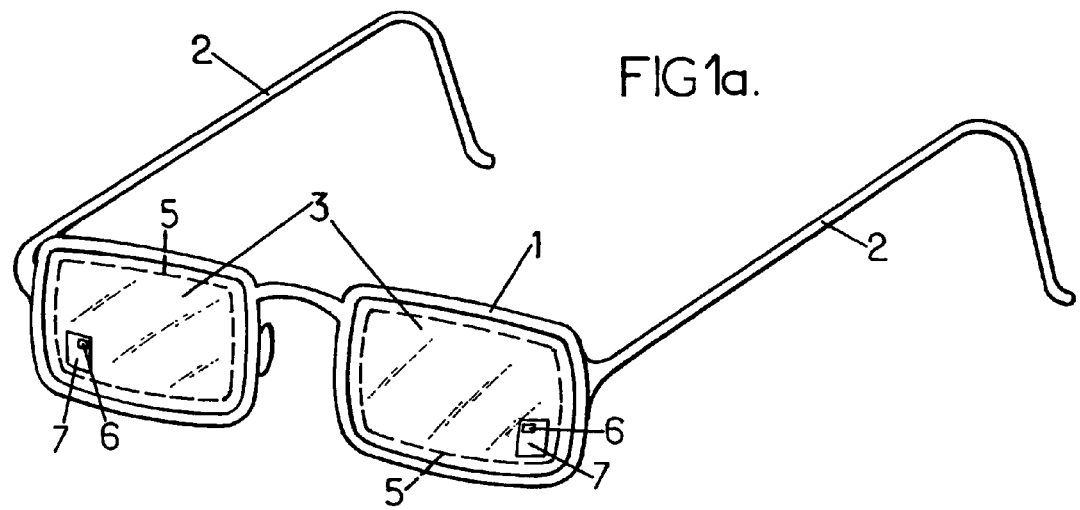
FIG. 1a shows a pair of spectacles in a first embodiment of the invention
Figure 1B:
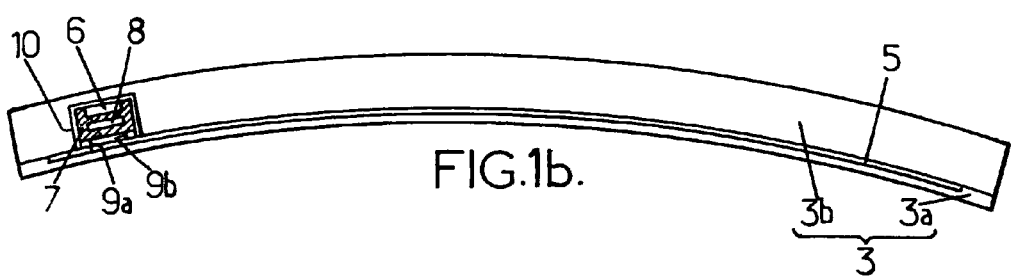

In a first embodiment, shown in FIGS. 1a and 1b, the photovoltaic cell is semiconductor-based. Such a photovoltaic cell can be made using any known technology, e.g. by using one of the following alloys: cadmium telluride (CdTe), gallium arsenide (GaAs), or a chalcopyrite containing copper such as copper and indium diselenide (CIS). Advantageously, the photovoltaic cell is based on single crystal silicon, or is based on microcrystalline or amorphous silicon.

Its cost is then low, and it does not contain any material presenting a risk of toxicity in the event of the lens being broken or damaged. Photovoltaic cells implemented using the above-listed technologies all present a spectral response that includes at least a portion of the spectrum that is visible to the human eye.

As shown in FIG. 1a, a pair of spectacles is constituted by a frame 1 having two temples 2, and two ophthalmic lenses 3 assembled in the frame 1. The term "ophthalmic lens" is used to mean any lens comprising a transparent substrate of inorganic and/or organic material, of composition and of shape that can be varied to fit a spectacles frame so as to protect and/or correct eyesight. The lenses may be afocal, unifocal, bifocal, trifocal, or progressive. In particular, an ophthalmic lens may present a structure comprising multiple layers and/or a laminated structure. Fabrication may then include operations of depositing layers on the substrate, e.g. by evaporating determined materials. Fabrication may also include operations of assembling a plurality of substrates together, i.e. "substrate units", in order to form the final substrate of each lens 3. Substrate units are assembled to one another by lamination or by adhesive, for example.

Each lens 3 incorporates a variable transmission system 5, e.g. a liquid crystal system. Such a liquid crystal system may be of the type having a holding voltage or it may be of the bistable type. A holding voltage system is controlled by an electrical voltage of about 3 volts, whereas a bistable system requires an electrical voltage pulse of 15 volts in order to cause optical switching to occur. The system 5 may be disposed over a fraction of the surface of the lens 3 that is used for vision purposes. It may also be disposed over the entire area of the lens.

Each lens 3 also incorporates a photovoltaic cell 6, e.g. of the single-crystal type, of microcrystalline silicon type or of amorphous silicon type. The photovoltaic cell 6 may be incorporated in an opaque component 7 integrated with the substrate of the lens and occupying an area that is significantly smaller than the area of the lens. Preferably, the opaque component 7 occupies an area of less than 10% of the area of the lens. The dimensions of the opaque component 7 may be 2 millimeters (mm) by 3 mm, for example. Such an opaque component 7 is located in a portion of each lens 3 that is not used for vision purposes, for example in a bottom side portion of the lens.

An electronic control circuit 8 (FIG. 1b) may also be incorporated in each optical component 7. Each control circuit 8 may comprise an adapter of the electrical voltage delivered by the photovoltaic cell 6 with which it is associated in a single component 7. The connection between the control circuit 8 and the photovoltaic cell 6 is also incorporated in the component 7. It can be made by using any of the known techniques for assembling integrated electronic circuits.

As shown in FIG. 1b, each of the lenses 3 may be constituted by two transparent substrate units 3a and 3b assembled together by adhesive in the proximity of their periphery. The substrate unit 3a is the posterior substrate and the substrate unit 3b is the anterior substrate. Each of the substrates 3a and 3b presents high light transmission in the visible spectrum, e.g. 97%.

The liquid crystal system 5 is interposed between the two substrates 3a and 3b in the form of a film. Preferably, the surface inside the lens of one of the substrates 3a or 3b presents a housing that is complementary in shape to the shape of the liquid crystal system 5. By providing such a housing, the operation of the liquid crystal system 5 is not disturbed by any stresses that might otherwise result from assembling the substrates 3a and 3b together.

The substrate unit 3b presents a housing 10 in its face that is on the inside of the lens. The housing 10 may be made when molding the substrate 3b, or it may be made by machining after the substrate 3b has been molded. The component 7 which incorporates the photovoltaic cell 6 and the control circuit 8 may be bonded adhesively in the housing 10. Two electrical connections 9a and 9b, secured to the component 7 and coming from the control circuit 8, each have a shape of contact point. When the two substrates 3a and 3b are assembled together via their respective surfaces that are inside the lens, the two connections 9a and 9b come into contact with the respective electrical power supply terminals of the liquid crystal system 5 which are placed so as to face the connections 9a and 9b during the assembly operation.

Although FIGS. 1a and 1b show only one photovoltaic cell arranged within each lens, a plurality of photovoltaic cells may be distributed over the surface of each lens. Under such circumstances, appropriate connections interconnect the photovoltaic cells within a given lens so as to obtain, in known manner, an electrical power supply that presents current and voltage characteristics adapted to the operation features of the liquid crystal system 5.

A larger number of photovoltaic cells of very small dimensions can also be integrated with each lens, with each cell occupying an area of the lens that is less than 100 square-micrometers, for example. Each photovoltaic cell then constitutes a spot that is individually invisible, and the lens remains overall transparent because of the gaps between neighbouring photovoltaic cells over the surface of the lens.

Figure 2A:
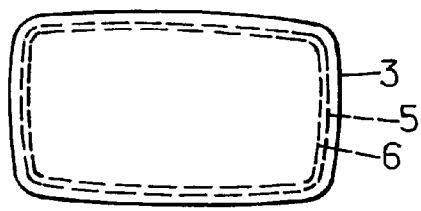
FIG. 2a shows a spectacles lens in a second embodiment of the invention.
Figure 2B:
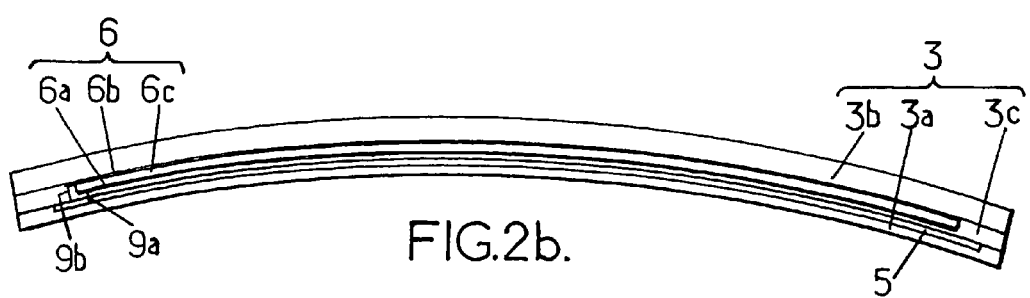

In a second embodiment as described below, the photovoltaic cell 6 is partially transparent. It possesses a light-collecting area that covers at least a portion of the area of each lens. Thus, as shown in FIGS. 2a and 2b, the portion of the area of the lens 3 that is occupied by the photovoltaic cell 6 may be of the same order as the portion of the area of the lens 3 that is occupied by the liquid crystal system 5.

Preferably, the light fraction absorbed by the photovoltaic cell 6 at any one point thereof is less than 30% of the light incident on the lens 3 at that point. Thus, the presence of the photovoltaic cell 6 in a portion of the surface of the lens 3 that is useful for vision purposes is nevertheless compatible with the lens 3 presenting high light transmission so long as its solar protection function is not activated.

The photovoltaic cell 6 may be of the photo-electrochemical type. It then comprises two transparent plane electrodes 6a and 6b (FIG. 2b) arranged so as to face each other parallel to the surface of the lens 3. The final substrate of the lens 3 is then made up of three substrate units 3a, 3b, and 3c that are assembled together in such a manner that the substrate unit 3c is located between the substrate units 3a and 3b. The electrodes 6a and 6b are arranged on the inner faces of the substrate units 3a and 3b that are facing each other. The electrodes 6a and 6b are spaced apart from each other by a distance of about 0.05 millimeters, and they are not in direct electrical contact with each other. At least one of the electrodes 6a or 6b may be based on indium and tin oxide (ITO) or on fluorine-doped tin oxide ($SnO_2$, F). They are separated by a cavity 6c that is filled with an electrolyte. The electrolyte could be liquid, but it is preferably solid. The electrolyte may also be replaced by an organic or an inorganic material having p-type conductive properties, i.e. constituted by a hole conductor.

The photo-electrochemical cell incorporates elements that are capable of absorbing a fraction of the light passing through the lens 3. By way of example, these elements may be nanocrystals or fullerenes. When the photo-electrochemical cell contains nanocrystals of metallic oxides, it may be of the type described in the article "A low-cost, high-efficiency solar cell based on dye-sensitized colloidal $TiO_2$ films" by Brian O'Regan and Michael Graetzel, Nature 353 (1991), pp. 737-740. Under such circumstances, the nanocrystals are based on titanium oxide ($TiO_2$) and have molecules of a dye grafted to their surfaces. Reference can be made to the above-mentioned article for further details on such a photovoltaic cell and methods of making it.

The liquid crystal system 5 is placed between the substrates 3a and 3c. Two connections 9a and 9b connect the photovoltaic cell 6 to the liquid crystal system 5.

The connection 9a connects the electrode 6a to one of the power supply terminals of the liquid crystal system 5, and the connection 9b connects the electrode 6b to the other power supply terminal of the system 5. Each of the connections 9a and 9b may have a configuration and a method of assembly of the same kind as described above with reference to FIG. 1b.

FIGS. 2a and 2b do not show a circuit for controlling the voltage supplied by the photovoltaic cell 6 to the liquid crystal system 5. Such a control circuit may be incorporated in the lens 3 of FIGS. 2a and 2b within an opaque component analogous to that described with reference to FIGS. 1a and 1b. Preferably, in the second embodiment described, the control circuit is implemented in a form that is directly integrated with one of the substrate units of the lens 3. In known manner, the control circuit may then also be transparent. It can be located in any portion of the surface of the lens 3 without reducing the field of view and without impeding the wearer of the spectacles.

In all embodiments of the invention, each lens may further comprise means for interrupting the supply of power from the photovoltaic cell to the electro-optical means. Such control means may comprise a switch that is connected in suitable manner. In particular, such a switch may be disposed on one of the connections connecting the photovoltaic cell to the electro-optical means. It then makes it possible to open the electrical circuit which powers the electro-optical means, so as to interrupt the supply of power thereto. The switch may also be connected between the power supply inputs of the electro-optical means. Short circuiting the power supply terminals of the electro-optical means then causes the optical function to be switched off. Such a switch can be controlled manually. It may be a miniature switch placed flush with the anterior surface of the lens. In particular, it may be a switch incorporated in an opaque component as described above.

Each lens may also include a photodiode or a phototransistor suitably connected to set intensity thresholds of incident light and particular modes of activating or deactivating the optical function. Such a photosensitive electronic component may also be incorporated in the opaque component. In a variant, it may be partially transparent and integrated directly in one of the unit substrates of the lens.

Finally, it should be understood that the invention presented above in the context of an application to spectacles lenses may also be applied to any other vision device. Specifically, such vision devices may comprise a helmet for a driver or a motorcyclist, or goggles for climbing or skiing. The photovoltaic cell and the electro-optical system are then integrated with the visor of the helmet or in the lens(es) of the goggles.

The invention claimed is:

1. An opthalamic spectacle lens comprising a transparent substrate and electro-optical means integrated with the substrate to perform an optical function in response to an electrical stimulus, the lens further comprising:
    (a) at least one photovoltaic cell integrated with the substrate to power the electro-optical means in response to an incident light; and
    (b) a control circuit for controlling the electrical voltage produced by said photovoltaic cell, said control circuit being integrated with the substrate.

2. The lens according to claim 1, wherein the photovoltaic cell is sensitive to visible light.

3. The lens according to claim 1, wherein the photovoltaic cell is semiconductor-based.

4. The lens according to claim 3, wherein the photovoltaic cell is based on single crystal, or is based on microcrystalline or amorphous silicon.

5. The lens according to claim 3, wherein the photovoltaic cell is based on cadmium telluride, or is based on a chalcopyrite containing copper.

6. The lens according to claim 3, wherein the photovoltaic cell is incorporated in an opaque component integrated with the substrate and occupying an area of less than 10% of the area of the lens.

7. The lens according to claim 3, wherein several photovoltaic cells are distributed in series over the area of the lens.

8. The lens according to claim 1, wherein several photovoltaic cells are distributed over the area of the lens at least one electrical voltage control circuit is integrated with the substrate.

9. The lens according to claim 1, wherein the photovoltaic cell is partially transparent and possesses a light-collecting surface that covers at least a portion of the surface of the lens.

10. The lens according to claim 9, wherein the photovoltaic cell is of the photo-electrochemical type.

11. The lens according to claim 10, wherein the photovoltaic cell includes at least one electrode based on indium and tin oxide or based on fluorine-doped tin oxide.

12. The lens according to claim 10, wherein the photovoltaic cell incorporates nanocrystals or fullerenes.

13. The lens according to claim 1, wherein the electro-optical means comprise a variable light transmission system.

14. The lens according to claim 13, wherein the variable light transmission system is based on liquid crystals.

15. The lens according to claim 13, wherein the variable light transmission system is of electrophoretic type.

16. The lens according to claim 1, comprising a control circuit for controlling the electrical voltage produced by the photovoltaic cell, said control circuit being integrated with the substrate.

17. The lens according to claim 1, wherein the control circuit is partially transparent.

18. The lens according to claim 1, wherein the control circuit comprises a step-up circuit for raising the electrical voltage produced by the photovoltaic cell.

19. The lens according to claim 1, further comprising control means for interrupting the power supplied by the photovoltaic cell to the electro-optical means.

20. A vision device including at least one opthalamic spectacle lens according to claim 1.

21. A vision device according to claim 20, comprising a pair of spectacles.

22. A pair of spectacles comprising a pair of opthalamic spectacle lenses each comprising each comprising a transparent substrate and electro-optical means intregrated with the substrate to perform an optical function in response to an electrical stimulus, the lens further comprising:

(a) at least one photovoltaic cell integrated with the substrate to power the electro-optical means in response to an incident light; and (b) a control circuit for controlling the electrical voltage produced by said photovoltaic cell, said control circuit being integrated with the substrate.

* * * * *